2,964,563
STABILIZING UNSATURATED AMINES

Howard W. Bost and Richard C. Doss, Bartlesville, Okla., assignors to Phillips Petroleum Company, a corporation of Delaware No Drawing. Filed Dec. 23, 1957, Ser. No. 704,264

12 Claims. (Cl. 260—583)

This invention relates to the stabilization of certain unsaturated amines. In one aspect, the invention relates to a method for treating such amines with a class of stabilizing agents.

Amines containing the fundamental structure

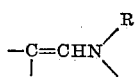

have valuable uses as end products and as intermediates, but it has now been found that these amines are unstable in the presence of even very minute amounts of water.

It has been found that such amines, upon long storage or storage at high temperatures decompose in the presence of even minute quantities of moisture to form gaseous products and heavy, gummy products. Thus, a costly loss of the valuable amines results; further, storage of such amines in closed vessels is hazardous and requires high pressure storage containers. The precise reason that very small amounts of water can effect such a substantial decomposition of the amines is not known.

It is an object of this invention to stabilize certain unsaturated amines against decomposition caused by the presence of moisture. It is another object of the invention to provide an improved method for storage of certain unsaturated amines.

Other objects, as well as aspects and advantages, of the invention, will become apparent from the study of the accompanying disclosure.

According to the invention, there is provided a process for the stabilization of unsaturated amines containing only hydrogen, carbon, and nitrogen and having the fundamental structure

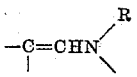

where R is a hydrocarbon radical, said amine containing from 4 to 30 carbon atoms, which comprises contacting said amine with a treating agent selected from the group consisting of the alkali metals, the alkali metal oxides, the alkali metal acetylides, the alkali metal amides, the alkaline earth metal acetylides, the alkali metal alkoxides, the alkaline earth metal alkoxides, alkoxides of metals of group III-B of the periodic table, and Grignard reagents of the formula RMgX wherein R is an alkyl or aryl radical and X is halogen, said agent preferably containing no more than 10 carbon atoms per molecule.

Ordinary drying agents that absorb or adsorb water, such as magnesium sulfate, are not effective to stabilize the amines.

Of the treating agents hereinbefore mentioned the alkali metals and the compounds of alkali metals hereinbefore referred to are especially useful.

The invention is particularly applicable to amines having the formula

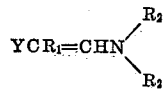

wherein $R_1$ is selected from the group consisting of hydrogen and alkyl radicals, each $R_2$ is selected from the group consisting of hydrogen, alkyl, alkenyl, and cycloalkyl radicals, and when one $R_2$ is a hydrogen radical the other $R_2$ is one of the other members of the last named group, where Y is selected from the group consisting of

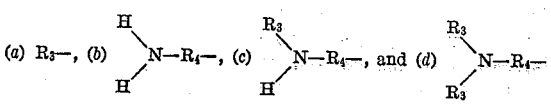

wherein each $R_3$ is selected from the group consisting of alkyl, cycloalkyl, and alkenyl radicals and $R_4$ is an alkylene radical, and compound having from 4 to 30 carbon atoms per molecule, preferably 4 to 18 carbon atoms per molecule.

The treatment of the amines is effected by intimately contacting the amine, usually in liquid phase, with one of the agents, or even with a mixture of same. More treating agent than is stoichiometrically equivalent to the amount of water present is employed. In the usual case, from 0.1 to 5 weight percent of treating agent based on the amine will satisfy this requirement. Frequently, in the practice of the invention, the amine will first be dried by conventional procedures to lower the water content to some low value, say less than one percent by weight, or even lower, before contacting with one of the agents according to the invention. The treating agent can then, if desired, be left in the reagent amine until just before use or even left therein during use, depending upon such use. Or the agent can be removed so as to remove the resultant compounds resulting from the reaction with water, and then more of the agent can be added to provide the desired excess.

The treated amines are stable even at elevated temperatures. Thus, the compounds can be stored in low pressure vessels without loss thereof and without the expense of resorting to high-pressure tanks during storage and shipment.

The amines treated according to the process of the invention are useful for neutralizing the acidity of petroleum oils in order to inhibit corrosion of metals by such oils. Such amines can be employed by adding to the oils from 100 parts per million to 5 parts per 100 parts by weight of oil. The amines can also be employed to scrub gases containing residual HCl so as to remove the acid therefrom. Also, because of the double bond and the nitrogen atoms, many of these amines are useful as intermediates for preparing valuable chemical compounds useful as surfactants, bacteriacides, and pharmaceuticals, and rubber processing agents.

Specific examples of treating agents useful according to the invention include ethyl magnesium chloride, butyl magnesium chloride, hexyl magnesium chloride, propyl magnesium bromide, phenyl magnesium chloride, sodium, potassium, lithium, rubidium, cesium, sodium oxide, potassium oxide, lithium oxide, monosodium acetylide, disodium acetylide, monopotassium acetylide, dipotassium acetylide, calcium acetylide (calcium carbide), barium acetylide (barium carbide), sodium amide, potassium amide, sodium ethoxide, sodium propoxide, potassium ethoxide, sodium isopropoxide, rubidium butoxide, calcium methoxide, calcium ethoxide, calcium propoxide, magnesium ethoxide, barium propoxide, aluminum methoxide, aluminum ethoxide, aluminum, propoxide, aluminum octoxide, and gallium ethoxide.

Specific examples of amines to which the invention is applicable include:

N-methyl-1-propene-1-amine
N-benzyl-1-propene-1-amine
N,N-dimethyl-1-propene-1-amine
N-ethyl-1-propene-1-amine
N-butyl-1-propene-1-amine
N-(2-butenyl)-1-propene-1-amine
N-methyl-1-pentene-1-amine
N-isopropyl-1-penetene-1-amine
N,N-dioctyl-1-pentene-1-amine
N-hexyl-1-hexene-1-amine
N,N-di(2-hexenyl)-1-hexene-1-amine
N-methyl-1-octene-1-amine
N-naphthyl-1-octene-1-amine
N-butadienyl-1-octene-1-amine
N-cyclohexyl-1-octene-1-amine
N,N-diphenyl-1-octene-1-amine
N-methyl-1-dodecene-1-amine
N-methyl-1-hexadecene-1-amine
N-heptyl-1-hexadecene-1-amine
N,N-diheptyl-1-hexadecene-1-amine
N-methyl-2-cyclohexyl-1-propene-1-amine
N-ethyl-3-cyclohexyl-1-butene-1-amine
N,N-diisopropyl-3-cyclohexyl-1-butene-1-amine
N-phenyl-4-cyclohexyl-1-heptene-1-amine
N-methyl-4-cyclopropyl-1-octene-1-amine
N-methyl-1,3-butadiene-1-amine
N-vinyl-1,3-butadiene-1-amine
N-propyl-1,5-hexadiene-1-amine
N-octyl-1,5-hexadiene-1-amine
N-cyclohexyl-1,6-octadiene-1-amine
N-phenyl-1,6-octadiene-1-amine
N-naphthyl-N-phenyl-1,6-octadiene-1-amine
N,N-diisopropyl-2-phenylethene-1-amine
N,N-dimethyl-2-naphthylethene-1-amine
N-methyl-N-ethyl-2-phenylethene-1-amine
N-methyl-N-ethyl-3-naphthyl-1-propene-1-amine
N-cyclopropyl-4-naphthyl-1-heptene-1-amine
N-cyclohexyl-4-naphthyl-1-octene-1-amine
N-(3-methylhexyl)-2-(4-methylphenyl)ethene-1-amine
N-propyl-2-(2,4,6-triethylphenyl)ethene-1-amine
N,N-diethyl-3-benzyl-1-propene-1-amine
N-(2,4,6-trimethylphenyl)3-benzyl-1-butene-1-amine
N-ethyl-3-benzyl-3-methyl-1-butene-1-amine
N-allyl-3-benzyl-1-pentene-1-amine
N-methyl-6-benzyl-1-hexene-1-amine
N,N'-dibutylethene-1,2-diamine
N,N'-dihexylethene-1,2-diamine
N,N'-di(2-propenyl)ethene-1,2-diamine
N,N'-di(1,3-butadienyl)ethene-1,2-diamine
N,N'-diphenylethene-1,2-diamine
N,N'-dibenzylethene-1,2-diamine
N,N'-diisopropylethene-1,2-diamine
N,N'-dioctylethene-1,2-diamine
N,N'-di(1-dodecenyl)ethene-1,2-diamine
$N^1$-methyl-1-butene-1,4-diamine
$N^1$-cyclohexyl-1-pentene-1,5-diamine
N,N'-dioctyl-1-hexene-1,6-diamine
N,N,N',N'-tetramethyl-1-heptene-1,7-diamine
N,N'-didodecyl-1-octene-1,8-diamine
N,N,N',N'-tetramethyl-1-nonene-1,9-diamine
$N^1$-methyl-1-decene-1,10-diamine
N,N'-diisopropyl-1-dodecene-1,12-diamine
N,N'-dimethylethene-1,2-diamine
N,N'-diethylethene-1,2-diamine
N,N'-dicyclohexylethene-1,2-diamine
N,N'-di(1,3-butadienyl)ethene-1,2-diamine
N,N'-diphenylethene-1,2-diamine
N,N'-dibenzylethene-1,2-diamine
$N^1,N^1$-dimethyl-1-propene-1,3-diamine
$N^1,N^1$-diethyl-1-butene-1,4-diamine
N,N'-diisopropyl-1-butene-1,4-diamine
$N^1$-methyl,$N^4$-butyl-1-butene-1,4-diamine
$N^1$-octyl,$N^1$-propyl-1-propene-1,3-diamine
$N^1$-ethyl,$N^6$-hexyl-1-hexene-1,6-diamine
N,N'-diethyl-3-cyclohexyl-1-butene-1,4-diamine
N,N'-bis(1,3-dimethylbutyl)-1-propene-1,3-diamine
N-ethyl-2-phenyl-2-cyclopropylethene-1-amine
N-methyl-3-cyclohexyl-3-phenyl-1-propene-1-amine
N,N-dimethyl-3-methyl-1,4-pentadiene-1-amine
N,N-dioctyl-2,3-diethyl-1,5-hexadiene-1-amine
N,N-di(2-hexenyl)-2,3-diphenyl-1-propene-1-amine
N-methyl-3-(2,4,7-triethylnaphthyl)-1-propene-1-amine
N,N-dimethyl-2-phenylethene-1-amine
N,N-diethyl-2-phenylethene-1-amine
N,N-dimethyl-2-cyclohexyl-1-propene-1-amine
N,N-diisopropyl-1,3-butadiene-1-amine
N,N,N',N'-tetraallylethene-1,2-diamine
N,N,N',N'-tetrabutylethene-1,2-diamine
N,N,N',N'-tetramethylethene-1,2-diamine
N,N,N',N'-tetraoctylethene-1,2-diamine
N,N'-dimethyl-1-butene-1,4-diamine
$N^1,N^1$-dimethyl-1-butene-1,4-diamine
N,N,N',N'-tetramethyl-1-butene-1,4-diamine
N,N,N',N'-tetraisopropyl-1-butene-1,4-diamine
N,N'-diphenyl-1-butene-1,4-diamine
N,N'-divinyl-1-butene-1,4-diamine
N,N,N',N'-tetramethyl-1-propene-1,3-diamine
N,N,N',N'-tetramethyl-1-butene-1,3-diamine
N,N'-diethyl-3-phenyl-1-propene-1,3-diamine
N,N,N',N'-tetramethyl-2-methyl-1-butene-1,3-diamine In the foregoing names, the numbered superscripts indicate the number of the carbon atom to which the nitrogen is attached.

The invention is especially useful when applied to the N,N,N',N'-tetraalkylalkene-1,3-diamines.

EXAMPLE I

For the trials described below, 40 ml. samples of N,N, N',N'-tetramethyl-1-butene-1,3-diamine were used. This diamine was prepared as described in Doss et al. Patent 2,800,509 and had been previously dried with magnesium sulfate which was then removed from the product. The refractive index $n_D^{20}$, of the product was 1.4677.

A sample of this product which had been stored in a closed container for several days was sealed in a stainless steel bomb (about 125 ml. capacity) having an attached pressure gauge. The bomb was placed in an oil bath and heated rapidly (within about 20 minutes) to 500° F. The pressure was recorded as shown in Table I. The test was terminated when the pressure reached 600 p.s.i. in order to avoid exceeding the capacity of the gauge. The refractive index of the recovered product was measured.

A comparable test was made using the same diamine stabilized with one gram of sodium. These results are also presented in Table I under column A.

The data presented in Table I clearly demonstrate improved stability of the diamine due to the presence of sodium. The pressure remained below 45 p.s.i.g. while heating the stabilized sample to 500° F. With the unstabilized material, the pressure reached 600 p.s.i.g. when the temperature reached 480° F. The refractive index of the products from the two tests shows that the sodium-stabilized product exhibited relatively little change.

*Table I*

STABILIZATION OF N,N,N',N'-TETRAMETHYL-1-BUTENE-1,3-DIAMINE WITH SODIUM

|  | A | B |
|---|---|---|
| Stabilizing Agent | Sodium | none |
| Refractive Index, $n_D^{20}$: |  |  |
| (a) Before bomb test | 1.4677 | 1.4677 |
| (b) After bomb test | 1.4741 | 1.5222 |

| Temperature, °F. | Pressure, p.s.i.g. | Pressure, p.s.i.g. |
|---|---|---|
| 400 | 15 | 300 |
| 450 | 25 | 460 |
| 480 | 35 | 600 |
| 500 | [1] 45 | (test terminated) |

[1] The pressure increased slowly to 60 p.s.i. during subsequent 60 minutes of aging while maintaining the temperature between 450 and 500° F.

EXAMPLE II

Another sample of the diamine described in Example I was redried using sodium metal. After storing the sample in the presence of sodium, with intermittent stirring, 40 ml. of the dry product was sealed in the 125 ml. bomb. The bomb was then immersed in an oil bath which was at a temperature of 500° F. Due to the cooling effect of the bomb, the bath temperature dropped about 50° F. during the first few minutes. As the bomb remained in the oil bath the pressure was recorded at various time intervals. These data are tabulated below:

| Time, minutes: | Pressure, p.s.i.g. |
|---|---|
| 0 | 0 |
| 5 | 100 |
| 10 | 175 |
| 15 | 200 |
| 30 | 200 |
| 40 | 175 |
| 60 | 165 |

At the end of the 60-minute period, the bomb was removed from the oil bath and cooled in a Dry Ice bath to a temperature below 0° C. The bomb was then vented and warmed to room temperature (about 25° C.). Considerable decomposition of the diamine was evident: volatile gases, possibly dimethyl amine, were evolved; a gummy residue amounting to about 30 percent by weight of the original diamine was in the bomb; and the liquid in the bomb amounted to only 19 ml. as compared with the original charge of 40 ml. This test when compared with Example I clearly demonstrates that the sodium must be present during the aging period in order to achieve maximum stabilization.

EXAMPLE III

A test was made similar to that described in Example I wherein sodium was used. For this test, however, anhydrous magnesium sulfate was used as the desiccant. The data obtained were as follows:

| Time, minutes | Temperature, °F. | Pressure, p.s.i.g. |
|---|---|---|
| 0 | 486 | 0 |
| 5 | 468 | 200 |
| 10 | 468 | 230 |
| 15 | 470 | 230 |
| 30 | 495 | 230 |
| 75 | 495 | 230 |

These data when compared with those reported in Example I demonstrate the improved stability obtained by use of sodium metal.

As will be evident to those skilled in the art, various modifications of this invention can be made or followed in the light of the foregoing disclosure and discussion without departing from the spirit or scope of the disclosure or from the scope of the claims.

We claim:

1. A process for the stabilization of an unsaturated amine consisting of hydrogen, carbon, and nitrogen wherein said amine has the formula

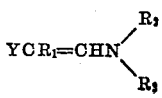

wherein $R_1$ is selected from the group consisting of hydrogen and alkyl radicals, each $R_2$ is selected from the group consisting of hydrogen, alkyl, alkenyl, and cycloalkyl radicals, and when one $R_2$ is a hydrogen radical the other $R_2$ is one of the other members of the last named group, where Y is selected from the group consisting of

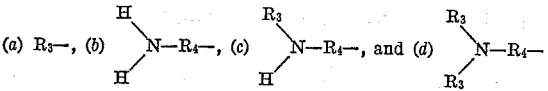

wherein each $R_3$ is selected from the group consisting of alkyl, cycloalkyl and alkenyl radicals and $R_4$ is an alkylene radical, said compound having from 4 to 30 carbon atoms per molecule, which comprises contacting said amine with a treating agent selected from the group consisting of the alkali metals, the alkali metal oxides, the alkali metal acetylides, the alkali metal amides, the alkaline earth metal acetylides, the alkali metal alkoxides, the alkaline earth metal alkoxides, alkoxides of metals of group III–B of the periodic table, Grignard reagents of the formula $R_5MgX$ where $R_5$ is an alkyl radical and X is a halogen, and Grignard reagents of the formula $R_6MgX$ where $R_6$ is an aryl radical and X is a halogen, said Grignard reagents containing a maximum of 10 carbon atoms per molecule, said amine also containing water, and said treating agent being employed in excess of an amount which is stoichiometrically equivalent to the amount of water present in said amine.

2. A process of claim 1 wherein said amine is N,N,N',N'-tetramethyl-1-butene-1,3-diamine.

3. A process of claim 1 wherein said amine is N,N,N',N'-tetramethylpropene-1,3-diamine.

4. A process of claim 1 wherein said amine is N,N'-dimethylpropene-1,3-diamine.

5. A process of claim 1 wherein said amine is N,N,N',N'-tetraethylpropene-1,3-diamine.

6. A process of claim 1 wherein said amine is N,N,N',N'-tetramethyl(2-methyl-1-butene)-1,3-diamine.

7. A process for the stabilization of an unsaturated amine consisting of hydrogen, carbon, and nitrogen wherein said amine has the formula

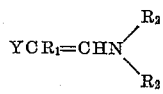

wherein $R_1$ is selected from the group consisting of hydrogen and alkyl radicals, each $R_2$ is selected from the group consisting of hydrogen, alkyl, alkenyl, and cycloalkyl radicals, and when one $R_2$ is a hydrogen radical the other $R_2$ is one of the other members of the last named group, where Y is selected from the group consisting of

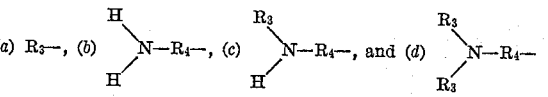

wherein each $R_3$ is selected from the group consisting of alkyl, cycloalkyl and alkenyl radicals and $R_4$ is an alkylene radical, said compound having from 4 to 30 carbon atoms per molecule, which comprises contacting said amine with a treating agent consisting of calcium carbide, said amine also containing water, and said treating agent being employed in excess of an amount which is stoichiometrically equivalent to the amount of water present in said amine.

8. A process for the stabilization of an unsaturated amine consisting of hydrogen, carbon, and nitrogen wherein said amine has the formula

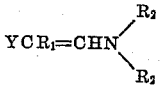

wherein $R_1$ is selected from the group consisting of hydrogen and alkyl radicals, each $R_2$ is selected from the group consisting of hydrogen, alkyl, alkenyl, and cycloalkyl radicals, and when one $R_2$ is a hydrogen radical the other $R_2$ is one of the other members of the last named group, where Y is selected from the group consisting of

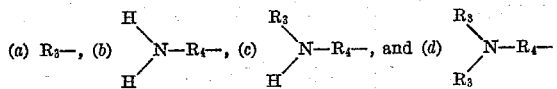

wherein each $R_3$ is selected from the group consisting of alkyl, cycloalkyl and alkenyl radicals and $R_4$ is an alkylene radical, said compound having from 4 to 30 carbon atoms per molecule, which comprises contacting said amine with a treating agent consisting of an alkali metal, said amine also containing water, and said treating agent being employed in excess of an amount which is stoichiometrically equivalent to the amount of water present in said amine.

9. A process of claim 8 wherein said amine is N,N,N',N'-tetramethyl-1-butene-1,3-diamine.

10. A process for the stabilization of an unsaturated amine consisting of hydrogen, carbon, and nitrogen wherein said amine has the formula

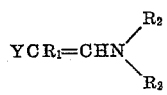

wherein $R_1$ is selected from the group consisting of hydrogen and alkyl radicals, each $R_2$ is selected from the group consisting of hydrogen, alkyl, alkenyl, and cycloalkyl radicals, and when one $R_2$ is a hydrogen radical the other $R_2$ is one of the other members of the last named group, where Y is selected from the group consisting of

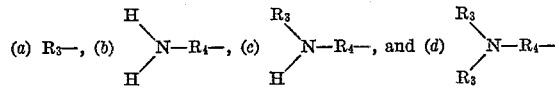

wherein each $R_3$ is selected from the group consisting of alkyl, cycloalkyl and alkenyl radicals and $R_4$ is an alkylene radical, said compound having from 4 to 30 carbon atoms per molecule, which comprises contacting said amine with a treating agent consisting of potassium, said amine also containing water, and said treating agent being employed in excess of an amount which is stoichiometrically equivalent to the amount of water present in said amine.

11. A process for the stabilization of an unsaturated amine consisting of hydrogen, carbon, and nitrogen wherein said amine has the formula

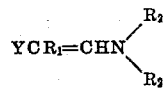

wherein $R_1$ is selected from the group consisting of hydrogen and alkyl radicals, each $R_2$ is selected from the group consisting of hydrogen, alkyl, alkenyl, and cycloalkyl radicals, and when one $R_2$ is a hydrogen radical the other $R_2$ is one of the other members of the last named group, where Y is selected from the group consisting of

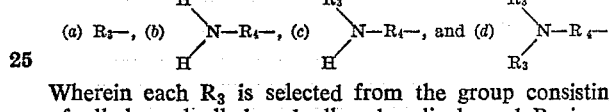

Wherein each $R_3$ is selected from the group consisting of alkyl, cycloalkyl and alkenyl radicals and $R_4$ is an alkylene radical, said compound having from 4 to 30 carbon atoms per molecule, which comprises contacting said amine with a treating agent consisting of sodium, said amine also containing water, and said treating agent being employed in excess of an amount which is stoichiometrically equivalent to the amount of water present in said amine.

12. A process of claim 11 wherein said amine is N,N,N',N'-tetramethyl-1-butene-1,3-diamine.

References Cited in the file of this patent
UNITED STATES PATENTS 2,172,822    Tamele et al. _____ Sept. 12, 1939